(12) United States Patent
Benyukhis et al.

(10) Patent No.: US 6,963,942 B2
(45) Date of Patent: Nov. 8, 2005

(54) HIGH AVAILABILITY SYSTEM AND METHOD FOR IMPROVED INTIALIZATION

(75) Inventors: Edward Benyukhis, Glenview, IL (US); Anatoly Belkin, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 339 days.

(21) Appl. No.: 10/006,176

(22) Filed: Dec. 4, 2001

(65) Prior Publication Data

US 2003/0105994 A1 Jun. 5, 2003

(51) Int. Cl.$^7$ ............................................. G06F 13/00
(52) U.S. Cl. ..................... 710/108; 710/10; 713/100; 714/8; 714/25
(58) Field of Search ............... 710/10, 108; 713/100, 713/300–340; 714/8, 25

(56) References Cited

U.S. PATENT DOCUMENTS

| | | | | |
|---|---|---|---|---|
| 4,131,945 A | * | 12/1978 | Richardson et al. | 364/200 |
| 5,321,830 A | * | 6/1994 | Nakamura et al. | 395/575 |
| 5,430,866 A | * | 7/1995 | Lawrence et al. | 395/575 |
| 5,438,675 A | * | 8/1995 | Fujioka | 395/182 |
| 5,450,576 A | * | 9/1995 | Kennedy | 395/650 |
| 5,815,647 A | * | 9/1998 | Buckland et al. | 395/182 |
| 6,202,160 B1 | * | 3/2001 | Sheikh et al. | 713/310 |
| 6,567,912 B1 | | 5/2003 | Belkin et al. | |

OTHER PUBLICATIONS

Jeff Tyson, "How PCI Works", www.howstuffworks.com.*
"ESCD", www.whatis.com.*

* cited by examiner

Primary Examiner—Kim Huynh
Assistant Examiner—Alan Chen
(74) Attorney, Agent, or Firm—Jeffrey K. Jacobs

(57) ABSTRACT

To address the need for a high availability system (100) and method of initializing that address failures that lock up common communication buses (109) in these systems, the present invention avoids powering-up peripheral components (e.g., 102–103) that have previously locked up the bus. It accomplishes this by storing indicators of successful initializations in memory (105), and then subsequently powering-up components only if such an indicator was stored for that component's last power-up.

14 Claims, 2 Drawing Sheets

HIGH AVAILABILITY SYSTEM AND METHOD FOR IMPROVED INTIALIZATION

FIELD OF THE INVENTION

The present invention relates generally to communication systems and, in particular, to the initialization of high availability systems.

BACKGROUND OF THE INVENTION

The fixed network equipment (FNE) of today's wireless telecommunications systems is expected to provide services on the order of 99.999% of the time. Thus, the high availability systems that make up the FNE must be designed to handle the inevitable component failures with minimal impact to user services. One problem that can occur in high availability systems is the failure of device cards during power-up and initialization. Particularly, problematic are failures that lock up a common communication bus that serves many or all of the device cards in a system chassis. These failures effectively disable the entire system and are not remedied by re-initializing the system. Thus, the system is down until the device card can be manually replaced or at least removed, likely impacting user services for a significant period of time. Therefore, a need exists for a high availability system and method of initializing that address failures that lock up common communication buses in these systems.

DESCRIPTION OF A PREFERRED EMBODIMENT

To address the need for a high availability system and method of initializing that address failures that lock up common communication buses in these systems, the present invention avoids powering-up peripheral components that have previously locked up the bus. It accomplishes this by storing indicators of successful initializations in memory, and then subsequently powering-up components only if such an indicator was stored for that component's last power-up.

Figure 1:
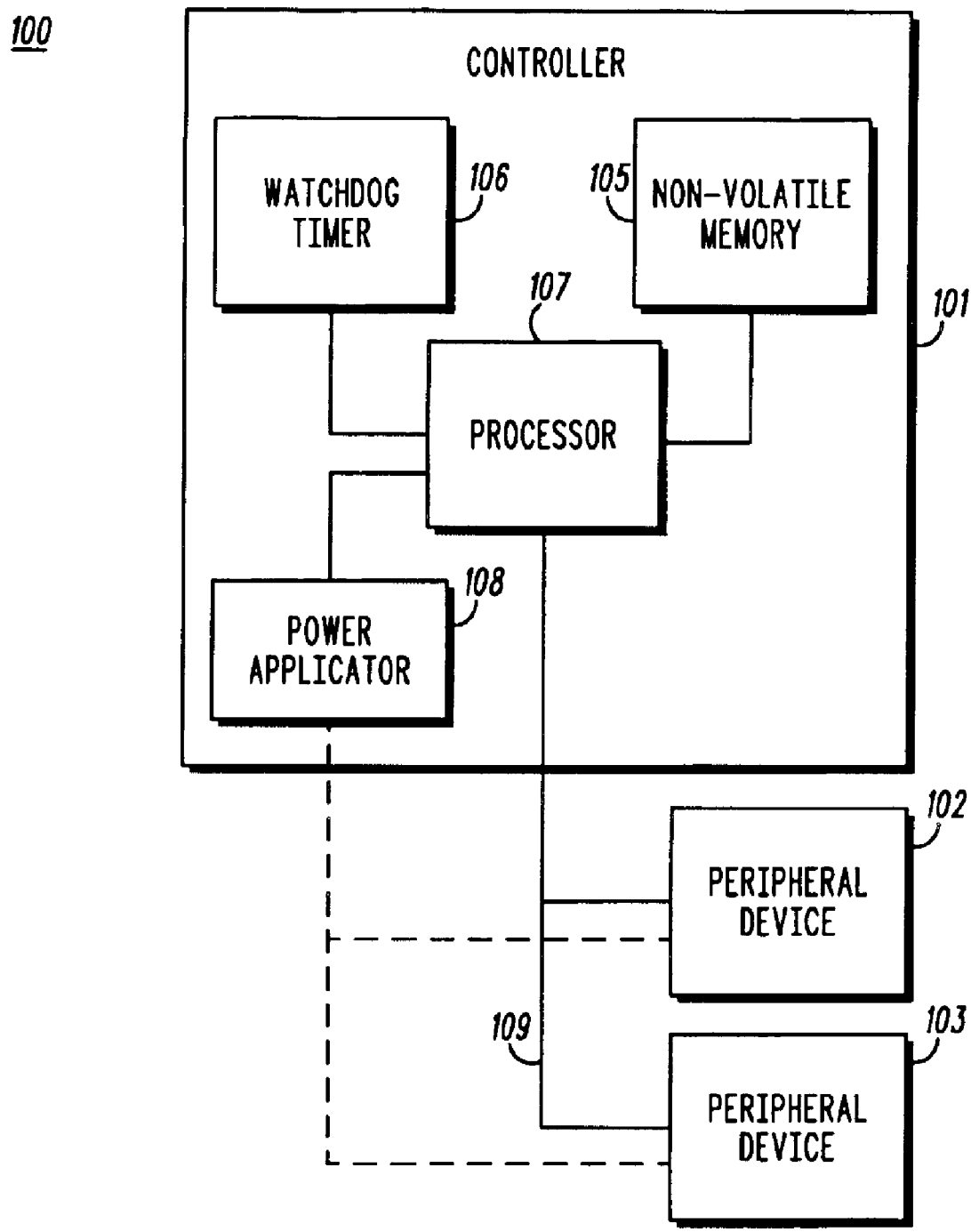
FIG. 1 is a block diagram depiction of a high availability system in accordance with a preferred embodiment of the present invention.
Figure 2:
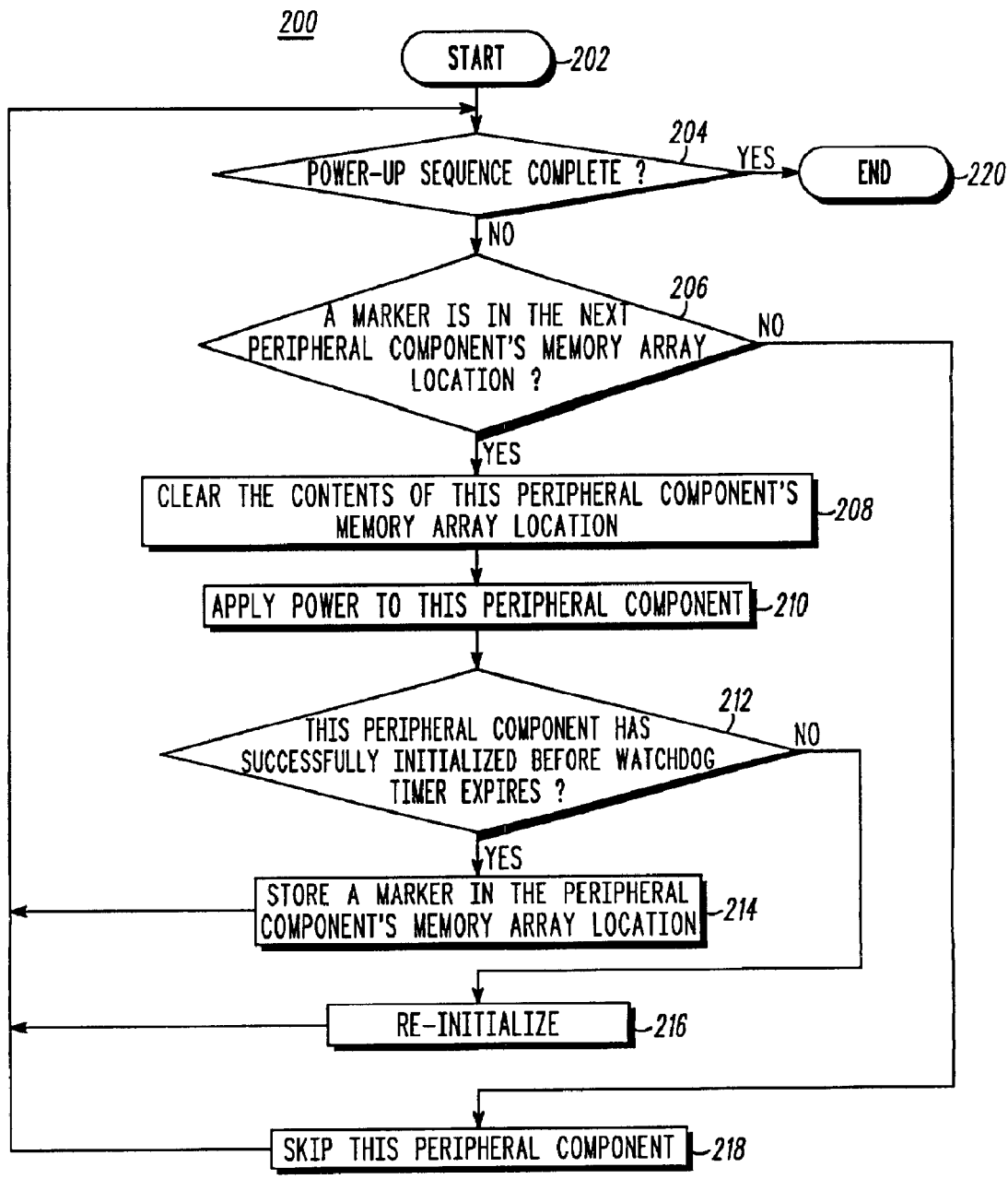
FIG. 2 is a logic flow diagram of steps executed by a high availability system in accordance with a preferred embodiment of the present invention.

The present invention can be more fully understood with reference to FIGS. 1–2. FIG. 1 is a block diagram depiction of high availability system 100 in accordance with a preferred embodiment of the present invention. The preferred embodiment comprises controller 101 and peripheral devices 102-103, all of which are interconnected by bus 109. Although system 100 is preferably a Compact Peripheral Component Interconnect (cPCI) system (specifically, an HA 8216 system available from the Motorola Computer Group, a division of Motorola, Inc. of Schaumburg, Ill.), system 100 could instead be a VersaModule Eurocard BUS (VME BUS) system, for example, or any other bus system that allows power to be controlled for individual peripheral components.

Peripheral devices 102-103 may include devices such as telecommunications networking cards, host bus adapters, and video interface cards, for example. Also, although only two peripheral devices are depicted in FIG. 1, it is understood that the present invention is not limited to any particular number of peripheral devices in the system. The present invention is applicable to any number of peripheral devices that the system bus can support and for which power is individually controlled.

Controller 101 preferably comprises non-volatile memory 105, watchdog timer 106, power applicator 108, and processor 107. Preferably, power applicator 108 comprises a Hot Swap Controller (HSC) that provides DC power to peripheral devices 102-103, and processor 107 comprises one or more microprocessors and memory devices. In the preferred embodiment, under the control of software/firmware algorithms stored in the memory devices of controller 101, controller 101 performs those control tasks well-known to high availability, computer system operation and, additionally, the method described relative to FIG. 2.

Operation of preferred high availability system 100, in accordance with the present invention, occurs substantially as follows. When system 100 initializes, as at power-up or upon a reboot, controller 101 applies power to peripheral devices 102-103 individually according to a predefined power-sequence. It will be assumed for purposes of illustration that peripheral 103 follows peripheral 102 in the power-up sequence.

During initialization, then, processor 107 preferably instructs power applicator 108 to apply power to peripheral 102. However, prior to applying power to peripheral 102, processor 107 preferably clears the contents of a location in a memory array stored in non-volatile memory 105 that corresponds to peripheral 102. Upon applying power and then receiving an indication that peripheral 102 has initialized, controller 101 stores an identifier of the first peripheral. Preferably, this identifier is a value stored in the location in the memory array in non-volatile memory 105 that corresponds to peripheral 102. Thus, since the location in the memory array serves to identify peripheral 102, the value that is stored can be anything that denotes peripheral 102's successful initialization, just as "clearing the contents" is equivalent to storing any value that indicates that peripheral 102 has not yet successfully initialized. Peripheral 102 having initialized, processor 107 preferably instructs power applicator 108 to apply power to the next peripheral in the power-up sequence, peripheral 103.

If, instead of successfully initializing, peripheral 102 locks up bus 109, controller 101 restarts the power-up sequence, preferably by reinitializing system 100. Preferred controller 101 comprises a hardware clock that serves as watchdog timer 106. Whenever bus 109 locks up, watchdog timer 106 expires and triggers a re-initialization of system 100.

Prior to reapplying power to peripheral 102 (and thereby locking up the bus, re-initializing, and endlessly repeating this cycle), controller 101 determines that an identifier of peripheral 102 was not stored. Controller 101 is able to make this determination because the contents of nonvolatile memory 105 survive re-initializations and power-downs of system 100. Preferably, processor 107 reads the location in the memory array in non-volatile memory 105 that corresponds to peripheral 102 and determines from the value read that peripheral 102 did not successfully initialize during the last power-up. That is, the value read does not denote that peripheral 102 successfully initialized.

Based on this determination, controller 101 skips peripheral 102 in the power-up sequence by not applying power to it. Thus, the present invention avoids the scenario in which peripheral 102 locks the bus during initialization, thereby disabling all of high availability system 100 until peripheral 102 can be serviced. For users who constantly rely on system 100's availability, extended downtime such as this is at least unacceptable if not catastrophic. The present invention enables system 100 to reinitialize without peripheral 102 and otherwise provide the service that its users depend on it to provide. Thus, although peripheral 102 has failed and will require servicing, the impact to system 100 users is minimized in view of the device failure.

FIG. 2 is a logic flow diagram of steps executed by a high availability system in accordance with a preferred embodiment of the present invention. Logic flow 200 begins (202) when the system is powering up its peripheral components according to a power-up sequence. The logic flow ends (220) when the system completes (204) its power-up processing for each component in the power-up sequence.

If components remain in the power-up sequence the next peripheral is processed. The system checks (206) this peripheral's memory array location, which is preferably stored in the system's nonvolatile random access memory. If the contents of this location indicate that the component successfully initialized on its last power-up (i.e., a particular marker is stored for this component), then the system clears (208) the contents of this component's memory array location and applies power (210) to the peripheral component.

If the component initializes (212) without locking up the bus, then an identifier of the component is stored (214). Preferably, this identifier is a value stored in the location in the non-volatile memory that corresponds to the peripheral component. Thus, since the location in this memory array serves to identify the peripheral, the value that is stored can be anything that denotes the peripheral's successful initialization. The logic flow then returns to the beginning to process to next component in the power-up sequence.

Instead, if the peripheral unit upon powering-up, locks up the bus, then the watchdog timer will expire and trigger a re-initialization (216) of the system. The logic flow returns to the beginning and the power-up sequence is restarted with the first component in the sequence. When the memory array location of the peripheral that locked up the bus is checked (206) for a marker indicating a successful initialization during its last power-up, the system will determine that none was stored. Thus, to avoid locking up the bus again, the system skips (218) powering up the failed component.

While the present invention has been particularly shown and described with reference to particular embodiments thereof, it will be understood by those skilled in the art that various changes in form and details may be made therein without departing from the spirit and scope of the present invention.

What is claimed is:

1. A method for improved initialization of a high availability system that comprises a controller component and a plurality of peripheral components, the method comprising the steps of:

applying power by a controller component to a first peripheral component of the plurality of peripheral components;

when an indication that the first peripheral component has initialized is received by the controller component, storing an identifier of the first peripheral component; applying power by the controller component to a next peripheral component of the plurality of peripheral components that follows the first peripheral component in a power-up sequence;

when the first peripheral component, while initializing, locks up a bus that the controller component and the plurality of peripheral components share, restarting the power-up sequence;
determining that an identifier of the first peripheral component was not stored; and
skipping the first peripheral component in the power-up sequence as a result of the step of determining to prevent the bus from being locked up.

2. The method of claim 1 wherein the step of restarting comprises re-initializing the high availability system.

3. The method of claim 2 further comprising the step of both expiring by a watchdog timer and triggering the re-initialization of the high availability system, when the first peripheral component locks up the bus.

4. The method of claim 2 wherein the step of storing comprises storing the identifier in a memory device whose contents survive a re-initialization of the high availability system.

5. The method of claim 4 wherein the memory device comprises a non-volatile random access memory.

6. The method of claim 1 wherein the step of storing comprises storing a value in a location in a memory array that corresponds to the first peripheral component.

7. The method of claim 6 further comprising the step of clearing the contents of the location in the memory array that corresponds to the first peripheral component prior to the step of applying power to the first peripheral component.

8. A high availability system comprising:

a first peripheral;

a second peripheral, wherein the second peripheral follows the first peripheral in a power-up sequence;

a bus to which the first peripheral and the second peripheral are connected; and a controller, connected to the bus, arranged to provide power to the first peripheral as part of the power-up sequence, arranged to store an identifier of the first peripheral and to apply power to the second peripheral when an indication that the first peripheral component has initialized is received, and arranged to restart the power-up sequence and skip the first peripheral in the power-up sequence as a result of determining that an identifier of the first peripheral was not stored when the first peripheral, while initializing, locks up the bus.

9. The high availability system of claim 8 wherein restarting the power-up sequence comprises re-initializing the high availability system.

10. The high availability system of claim 9 wherein the controller further comprises a clock that serves as a watchdog timer arranged to expire and trigger the re-initialization of the high availability system when the first peripheral component locks up the bus.

11. The high availability system of claim 9 wherein the controller further comprises a memory device whose contents survive a re-initialization of the high availability system.

12. The high availability system of claim 11 wherein the memory device comprises a non-volatile random access memory.

13. The high availability system of claim 8 wherein the controller is further arranged to store a value in a location in a memory array that corresponds to the first peripheral serving as an identifier of the first peripheral.

14. The high availability system of claim 13 wherein the controller is further arranged to clear the contents of the location in the memory array that corresponds to the first peripheral prior to the step of applying power to the first peripheral component.

* * * * *